United States Patent [19]

Barnett et al.

[11] Patent Number: 4,506,035
[45] Date of Patent: Mar. 19, 1985

[54] MICROPOROUS HYDROPHILIC FLUOROPOLYMER MEMBRANES AND METHOD

[75] Inventors: George H. Barnett, North Balwyn; Michael V. Markus, East Malvern, both of Australia

[73] Assignee: ICI Australia Limited, Melbourne, Australia

[21] Appl. No.: 473,160

[22] PCT Filed: Jun. 25, 1982

[86] PCT No.: PCT/AU82/00103

§ 371 Date: Feb. 17, 1983

§ 102(e) Date: Feb. 17, 1983

[87] PCT Pub. No.: WO83/00157

PCT Pub. Date: Jan. 20, 1983

[30] Foreign Application Priority Data

Jun. 26, 1981 [AU] Australia ............... PE9455

[51] Int. Cl.³ ............... C08J 9/36; C08F 8/00; C08F 259/08

[52] U.S. Cl. ............... 521/53; 204/159.15; 204/159.17; 525/276; 521/134

[58] Field of Search ............ 521/53, 64, 134, 145, 521/905; 525/276; 204/159.15, 159.17

[56] References Cited

U.S. PATENT DOCUMENTS

| | | | |
|---|---|---|---|
| 3,442,780 | 5/1969 | Levine | 525/276 |
| 3,666,693 | 5/1972 | Chapiro et al. | 525/276 |
| 3,839,172 | 10/1974 | Chapiro et al. | 204/159.17 |
| 3,929,934 | 12/1975 | Moore et al. | 525/276 |
| 4,049,589 | 9/1977 | Sakane | 521/145 |
| 4,115,303 | 9/1978 | Marchand et al. | 521/53 |
| 4,129,617 | 12/1978 | Machi et al. | 204/159.17 |
| 4,132,682 | 1/1979 | Seita et al. | 521/27 |
| 4,137,137 | 1/1979 | Machi et al. | 204/159.16 |
| 4,151,225 | 4/1979 | Buening | 525/276 |
| 4,155,953 | 5/1979 | Tatemoto et al. | 525/276 |
| 4,188,354 | 2/1980 | Munari et al. | 525/276 |
| 4,278,777 | 7/1981 | Jakabhazy et al. | 525/276 |
| 4,326,046 | 4/1982 | Miyaka et al. | 525/276 |
| 4,407,846 | 10/1983 | Machi et al. | 427/35 |
| 4,466,931 | 8/1984 | Tanny | 264/22 |

FOREIGN PATENT DOCUMENTS

| | | |
|---|---|---|
| 801528 | 9/1958 | United Kingdom ............... 525/276 |
| 950269 | 2/1964 | United Kingdom . |
| 1302619 | 1/1973 | United Kingdom . |
| 1435477 | 5/1976 | United Kingdom . |
| 1531068 | 11/1978 | United Kingdom . |

OTHER PUBLICATIONS

A. S. Tevlina et al., "Preparation and Properties of Homogeneous Cation Exchange Membranes with Complex-Forming Groups", International Polymer Science and Technology, vol. 4, No. 4, 1977, pp. T/82-83.

*Primary Examiner*—Herbert S. Cockeram
*Attorney, Agent, or Firm*—Cushman, Darby & Cushman

[57] ABSTRACT

An hydrophilic microporous diaphragm comprising a fluorine-containing substrate to which has been radiation co-grafted a mixture of monomers comprising at least one functional monomer of formula I, $CF_2=CF(CF_2)_nA$, formula II, $CF_2=CF-O-(CFX-CFX)_mA$, a dicarboxylic acid containing the group of formula III, $-R^3(COOH)-R^4(COOH)-$, and at least one non-functional monomer of formula IV, $CY_2=CYZ$, or formula V

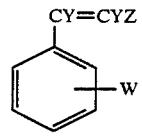

wherein the molar ratio of co-grafted functional monomer to non-functional monomer is in the range of 2:1 to 1:20. These diaphragms have enhanced wettability for improved performance in chlor-alkali cells.

29 Claims, No Drawings

MICROPOROUS HYDROPHILIC FLUOROPOLYMER MEMBRANES AND METHOD

TECHNICAL FIELD

This invention relates to a method of rendering hydrophobic fluoropolymers hydrophilic.

In particular the invention relates to a method of preparing hydrophilic fluoropolymers suitable for use as microporous diaphragms in electrochemical cells, especially in cells electrolyzing alkali metal chloride solutions.

BACKGROUND ART

Electrolytic cells are commonly used to make chlorine and an alkali metal hydroxide solution by electrolysis of an alkali metal chloride solution. Such cells are known as chlor-alkali cells. Reference is made in this specification to chlor-alkali cells and processes as typifying electrolytic cells and processes in general.

There are three broad types of chlor-alkali cell, "mercury", "diaphragm" and the more recently developed "membrane" cells.

In membrane cells the anodes and cathodes are separated by cation-active permselective membranes; these are membranes which are selectively permeable so as to allow the passage of only positively charged ions and not the passage of bulk electrolyte. Cation-active perm-selective membranes which are suitable for this use in chlorine cells include, for example, those made of synthetic organic copolymeric material containing cation-exchange groups, for example, sulphonate, carboxylate and phosphonate. Perm-selective membranes are non-porous.

On the other hand, diaphragm cells, in which the anodes and cathodes are separated by porous diaphragms, permit the passage of both positive and negative ions and of electrolyte.

In operating a diaphragm cell for the electrolysis of alkali metal chloride solutions to give chlorine and alkali metal hydroxides, it is essential that flow of the solutions through the tortuous microporous diaphragm be unimpeded by gas voids in the porous network.

Diaphragms prepared from asbestos fibres have generally been used but these suffer from the disadvantage that (1) the lifetime of the fibrous asbestos network in the chlor-alkali cells is limited;
(2) the handling of asbestos fibres is often environmentally undesirable; and
(3) the thickness of the fibrous matte limits the extent to which the interelectrode gap can be reduced.

Alternatively diaphragms comprising fluoropolymer materials in sheet or in fibrous form which are inert to the cell liquors have been proposed. However, these diaphragms suffer from the problem that they are hydrophobic and difficult to wet with alkali metal chloride and hydroxide solutions and in consequence tend to have gas-filled voids in the porous network of the diaphragm. This can lead to diaphragm blockage, high voltages and mixing of the product gases, hydrogen and chlorine.

Several methods have been proposed for rendering such diaphragms hydrophilic. For example UK Patent 1,081,046 and Belgian Patent 794,889 to ICI Ltd describe processes for microporous sheet diaphragms in which a hydrophilic particulate inorganic additive such as titanium dioxide is added to confer hydrophilicity on the diaphragm matrix. Other additives such as surface active agents have also been proposed for this purpose.

These additives suffer from the disadvantage that (1) they generally affect adversely the processing of the fluoropolymers into a fibrous or sheet form;
(2) they are readily leached out by flow through the diaphragm; and
(3) initial wetting out of the tortuous microporous network is difficult to achieve satisfactorily.

It is an objective of the present invention to provide hydrophilic fluorocarbon membranes for use in chlor-alkali electrolysis cells.

We have now devised a process of rendering hydrophobic fluorocarbon polymers hydrophilic by means of graft copolymerization of certain monomers to the hydrophobic fluorocarbon polymer substrate.

DISCLOSURE OF INVENTION

Accordingly the present invention provides an hydrophilic fluoropolymeric diaphragm comprising a fluorine-containing substrate to which has been radiation co-grafted a mixture of monomers comprising at least one functional monomer selected from compounds of formula I

$$CF_2=CF(CF_2)_nA$$

and formula II

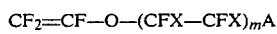
$$CF_2=CF-O-(CFX-CFX)_mA$$

wherein A is carboxyl, alkoxycarbonyl, hydroxyalkoxycarbonyl, cyano, hydroxysulfonyl, fluorosulfonyl, or the group $-CO-NR^1R^2$ wherein $R^1$ and $R^2$ are independently selected from hydrogen and $C_1$ to $C_6$ alkyl, one X is fluorine and the other X is selected from chlorine, fluorine and a trifluoromethyl group, n is an integer from 1 to 12, m is an integer from 1 to 3; and unsaturated dicarboxylic acids or derivatives thereof containing the group of formula III

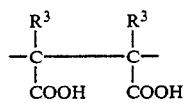

wherein $R^3$ and $R^4$ may be the same or different and represent hydrogen, fluorine, chlorine, and represent hydrogen, fluorine, chlorine, and $C_1$ to $C_6$ alkyl or halogenated $C_1$ to $C_6$ alkyl group or together form a double bond; and at least one non-functional monomer selected from the group consisting of aliphatic vinyl monomers of formula IV

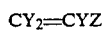
$$CY_2=CYZ$$

and aromatic vinyl monomers of formula V

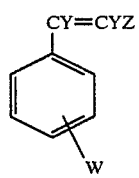

wherein Y is hydrogen or fluorine, Z is hydrogen, fluorine or chlorine, and W is hydrogen, $C_1$ to $C_6$ alkyl, $C_2$ to $C_6$ alkenyl, halogenated $C_1$ to $C_6$ alkyl or halogenated $C_2$–$C_6$ alkenyl.

By the term "functional monomers" reference is made to the presence of the cation exchange groups in the monomer, such as carboxylic acid and sulphonic acid, or to groups which can be readily converted to cation exchange groups, such as for example carboxylic esters and amides, and ntriles. By the term "non-functional monomers" reference is made to the absence of any ion-exchange group in those monomers.

The molar ratio of co-grafted functional monomer to non-functional monomer is in the range of 2:1 to 1:20. Preferably the molar ratio is in the range from 2:1 to 1:3.

The preferred fluorine-containing substrate is a homopolymer or copolymer of fluorinated ethylene, especially a homopolymer or a copolymer of vinyliden fluoride, tetrafluoroethylene, chlorotrifluoroethylene or hexafluoropropylene. Typical preferred substrates are polytetrafluoroethylene (PTFE); polychlorotrifluoroethylene (PCTFE) and FEP which is the common name for the copolymer of tetrafluoroethylene and hexafluoropropylene wherein the hexafluoropropylene incorporated in the said copolymer is in the range of 3.5–12.5% w/w.

The preferred functional monomers of formula I for use in our process include pentafluorobutenoic acid and $C_1$ to $C_6$ alkyl pentafluorobutenoates such as methyl pentafluorobutenoate and ethyl pentafluorobutenoate. A preferred functional monomer of formula II is trifluorovinylsulfonyl fluoride. Preferred functional monomers of formula III are maleic acid, 1,2-difluoromaleic acid, acetylenedicarboxylic acid, and amides, anhydrides, and $C_1$ to $C_6$ alkyl esters derived from these.

Preferred non-functional monomers of formula IV are tetrafluoroethylene and chlorotrifluoroethylene. Preferred non-functional monomers of formula V are styrene and its halogenated derivatives, such as $\alpha,\beta,\beta$-trifluorostyrene and divinylbenzene and its halogenated derivatives, such as $\alpha,\beta,\beta,\alpha',\beta',\beta'$-hexafluorodivinylbenzene.

By co-grafted functional and non-functional monomers on a polymeric substrate we mean that the functional and non-functional monomers form co-polymer side chains on the polymeric substrate such that the functional monomer is attached to the substrate by means of a non-functional monomer.

The molecular structures of one type of the side chains of the resins of the diaphragm of the present invention may be represented diagrammatically as follows

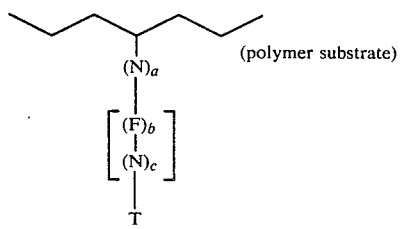

wherein F and N are the mer units derived from the functional and non-functional monomers respectively; T is a polymer chain-terminating group or polymer substrate; a, b, and d are one or more and c is zero or one or more.

It will be appreciated that this representation does not cover all the possible configurations of the side chains of the resins of the present invention, for example it is also intended that the scope of the invention shall include side chains having branched configurations, and/or having ordered or random distribution of the functional and non-functional mer units and/or having more than one type of functional unit and/or having more than one type of non-functional unit.

In a further embodiment of our invention we provide a process of preparing a hydrophilic fluoropolymeric diaphragm, as hereinbefore defined, which process comprises radiation co-grafting at least one functional monomer as hereinbefore defined, and at least one non-functional monomer as hereinbefore defined, onto a fluoropolymeric diaphragm comprising a polymer or copolymer of a fluorinated ethylene as hereinbefore defined.

It is a characteristic of this process that all of the side chains formed by the co-grafting process are linked to the substrate polymeric diaphragm by at least one of the non-functional mer unts derived from the non-functional monomer. Thus the non-functional monomer provides a linking group whereby the non-functional monomers may be grafted onto the polymeric substrate.

In this process the functional monomeric material and the non-functional monomeric material are mixed in proportions such that the molar ratio of the monomers present is in the range of 1:20 to 9:1 respectively. Preferably the molar ratio is in the range of 1:4 to 4:1 and more preferably, in order to obtain the preferred resins of this invention, the monomeric materials are mixed in nearer to equimolar proportions, i.e. in the range 2:1 to 1:2.

The mixture of monomeric materials has to be in a liquid form and, if necessary, a common solvent is used to prepare a solution of them. Commonly one of the monomeric materials itself will provide the liquid phase dissolving the other monomeric material.

Alternatively, with advantage, the solvent used is one which will penetrate the substrate material and cause it to swell, thereby allowing the solution of monomers to be absorbed right through the substrate material. Suitable solvents are, for example, toluene and xylene, and chlorinated hydrocarbons such as trichlorotrifluoroethane and oligomers of tetrafluoroethylene, for example, the tetramer and pentamer of tetrofluoroethylene.

It is also within the scope of this invention for the substrate material to be preswelled with such solvents prior to the addition of the monomers, the advantage of this procedure being that minimum quantities of solvent are used.

Any of the known methods of radiation grafting may be employed. For example, the substrate and monomeric materials may be subjected together to continuous or intermittent radiation, or the substrate may be pre-irradiated prior to bringing it into contact with the monomeric materials. Preferably the substrate and monomeric materials are irradiated together; the substrate is immersed in the liquid phase containing the mixed monomeric materials and the whole subjected to irradiation by γ-rays, X-rays or electron beam, but preferably by γ-rays.

It is essential for the process of the invention that both the functional monomeric material and the non-functional monomeric material are present together during the grafting process so that the free radicals generated by the radiation may initiate both the grafting of non-functional groups to the substrate and, concurrently, the copolymerization of the functional and non-functional monomeric materials to form the chains which characterize the resins of the present invention. Preferably the grafting process is carried out in the absence of oxygen.

In those cases where a derivative of the functional monomer is employed in the grafting process, for example, maleic anhydride, subsequent chemical treatment such as hydrolysis is required to render the dicarboxylate derivative into the active acid form.

It also lies within the scope of our invention to introduce further cation exchange active groups to the resins, as hereinbefore defined comprising a substrate, functional groups and non-functional groups. The additional active groups are introduced by chemical modification of the groups already present. Thus, for example, the non-functional groups in the side chains may be sulphonated and/or carboxylated to give active resins having enhanced ion exchange capacity and wettability.

In a further embodiment of the process of our invention the functional and non-functional monomers are radiation co-grafted onto fluoropolymeric substrate material, as hereinbefore defined, in particulate form such as beads or powder. The co-grafted product is then fabricated into a diaphragm by any of the conventional means such as by a process of stretching of the resin. This is less preferred than direct co-grafting of the preformed diaphragm since in the latter case it is possible to achieve the desired hydrophilicity by grafting the monomeric material only to the surfaces of the micropores in the diaphragm thus reducing the quantity of monomeric material required.

BEST MODE OF CARRYING OUT THE INVENTION

The radiation co-grafting of the functional and non-functional linking monomers onto the polymeric substrate appears to be governed by two competing reactions. One of these is the desired co-grafting of the functional monomer on to the non-functional linking monomer which is in turn grafted to the polymeric substrate. The second is the copolymerization of monomers. Since the rate of copolymerization may be greater than the desired co-grafting, in a preferred embodiment of the process of radiation co-grafting the functional and non-functional linking monomers onto fluorine-containing hydrocarbon polymeric substrate, as hereinbeforedefined, we provide the improvement comprising the addition of at least one polymerization inhibitor and at least one chain transfer agent. In this embodiment higher levels of co-grafting can be achieved, typically the level of grafting is increased by a factor of three or more. The resins from our improved process have higher ion exchange capacity, and when such resins are incorporated into diaphragms for use in electrolytic cells, much better performance is achieved in those cells.

The preferred polymerization inhibitors for use in the process of our invention include, for example, quinone inhibitors such as p-benzoquinone, naphthaquinone, and hydroquinone in the presence of oxygen; inorganic inhibitors such as copper acetate; and compounds such as 2,2,6,6-tetramethyl-4-oxo-piperidine-1-oxide, 2,2,6,6-tetramethylpiperazine-N-oxide and chloranil.

The concentration of inhibitor used in the process of our invention is in the range of 0.001 to 2% w/w of the total mixture of functional and linking monomers and charge transfer agents, preferably in the range of 0.01 to 0.5% w/w.

Since the radiation co-grafting is preferably carried out in a liquid medium it is preferable that the chain transfer agents are also solvents for the monomers. Preferred chain transfer solvents include, for example, chloroform, carbon tetrachloride, dimethylformamide and mixtures thereof. Suitable mixtures are for example, chloroform, carbon tetrachloride, dimethylformamide and mixtures thereof. Suitable mixtures are for example carbon tetrachloride/chloroform (1:1) and carbon tetrachloride/dimethylformamide (1:9). The concentration of monomers in the chain transfer solvents is in the range of 10–60% w/w, preferably in the range of 30–50% w/w.

Solid chain transfer agents are less preferred since additional solvents may be necessary to provide a liquid medium for the radiation co-grafting. If solid chain transfer agents are used the w/w ratio of such transfer agents to the monomers should be in the same range as that referred to hereinabove for the preferred chain transfer solvents.

INDUSTRAL APPLICABILITY

Hydrophilic diaphragms, according to the present invention, have enhanced properties particularly as regards wettability by the liquids present in electrolytic cells and therefore they find particular application in electrolysis cells. They may also be usefully employed in other electrochemical systems, for example, as separators in batteries, fuel cells and electrolysis cells.

The invention is now illustrated by, but not limited to, the following examples in which all ion-exchange capacities are those relating to highly alkaline conditions, ie all carboxylic acid and sulfonic acid groups are acting as exchange sites. Unless otherwise stated all parts and percentages are on a weight basis.

EXAMPLE 1

100 grams of commercially available "KEL-F" powder (registered trade mark for the homopolymer of chlorotrifluoroethylene), free of additives and having a particle size about 150 mesh were suspended in monochlorobenzene (300 ml), containing also 10.0 g (0.096 moles) of styrene and 9.4 g (0.096 moles) of maleic anhydride, in a reaction vessel fitted with stirring means, heating means, gas inlet and outlet ports and condensing means. The suspension was subjected to gamma radiation.

Before and during the gamma radiation a stream of nitrogen gas was bubbled through the contents of the vessel. The contents of the vessel were heated to 52.5° C. under agitation and subjected to gamma radiation for a total of 4.5 hours at a dose rate of 250 krad/hr. The radiated mixture received the total dose of 1125 krad, after which the radiation, heating and stirring ceased. The grafted resin powder was quantitatively transferred to a washing column and washed free from unreacted monomers, solvent and unwanted byproducts. Finally, the resin was converted into the acid form and dried in vacuum oven at 60° C.

The percentage graft, which is calculated by expressing the weight increase of the resin as a percentage of the weight of grafted resin produced, was 2.25%. The ion exchange capacity was determined by titration to be 0.18 meq/g.

Since the ion exchange capacity is related to the amount of the functional monomer (maleic anhydride) incorporated by grafting, it provides a measure of the degree of hydrophilicity obtained by the radiation co-grafting process of the invention. Assuming equimolar proportions of the groups derived from the styrene and from the maleic anhydride monomers in the polymeric side chains grafted onto the "KEL-F" skeleton, the theoretical ion exchange capacity of a resin with a 2.25% graft would be 0.20 mg/g. Examination of the infrared spectrum of the product had shown the presence of dicarboxylic acid and styrene in the molecular structure of the resin.

When placed in an aqueous medium containing 25% w/w sodium chloride the hydrolyzed resin was wetted by the solution and sank to the bottom of the solution. The fluoropolymer powder before being grafted and hydrolyzed could not be wetted by the solution and formed a white surface film on the liquid.

This resin is pressed to form a film and then a microporous diaphragm is prepared by a technique known in the art as calendering wherein the film is X-Y dimensionally stretched until the desired pore size is reached. The diaphragm is built up to the desired size by successive layers of stretched film. The hydrophilicity of the resin is unchanged during these processes of fabrication so that the hydrophilic properties are conferred on the final diaphragm.

EXAMPLES 2 to 5

Graft copolymers of styrene-maleic anhydride to "KEL-F" powder, according to the present invention, were made by the method described in Example 1, except that different total monomer concentrations (keeping the molar ratios of monomers constant) were used to produce various levels of grafts, resulting in various exchange capacities of the grafted product resin as shown in Table 1.

TABLE 1

| Example | 2 | 3 | 4 | 5 |
|---|---|---|---|---|
| Concentration of monomers in monochlorobenzene | | | | |
| Styrene g/l | 21.0 | 53.3 | 126.6 | 286.6 |
| Maleic anhydride g/l | 19.7 | 50.7 | 120.0 | 266.6 |
| Percentage graft % | 1.25 | 3.12 | 5.06 | 8.01 |
| Theoretical ion exchange capacity meq/g | 0.11 | 0.28 | 0.44 | 0.67 |
| Measured ion exchange capacity meq/g | 0.09 | n.d. | 0.40 | n.d. |

Infra-red analysis confirmed the presence of dicarboxylic acid and styrene in the molecular structure of the grafted resin products. All of the hydrolyzed resins were wettable by 25% sodium chloride solution.

These resins are formed into microporous diaphragms by the method described in Example 1.

EXAMPLES 6 to 8

These examples illustrate the products of the present invention having a different fluorine containing hydrocarbon polymer substrate to those of example 1 to 5.

In these examples styrene and maleic anhydride were graft copolymerized by the process according to the invention, using the conditions described in Example 1, to "FLUON" powder, which is a homopolymer of tetrafluoroethylene ("FLUON" is a registered trade mark of Imperial Chemical Industries Ltd). The percentage grafts and ion exchange capacities of the product resins in their acid form obtained using various monomer concentrations are given in Table 2.

TABLE 2

| Example | 6 | 7 | 8 |
|---|---|---|---|
| Concentration of monomers in monochlorobenzene | | | |
| styrene g/l | 21.0 | 33.7 | 143.3 |
| maleic anhydride g/l | 19.7 | 31.7 | 135.0 |
| Percentage graft % | 0.75 | 1.22 | 3.12 |
| Theoretical ion exchange capacity | 0.06 | 0.11 | 0.28 |
| Measured ion exchange capacity meq/g | n.d. | 0.08 | n.d. | dicarboxylic acid and styrene in the molecular structure of the grafted resin products.

These resins are formed into microporous diaphragms by the method described in Example 1.

EXAMPLES 9 TO 12

Treatment of samples of products from some of the previous examples by a known process for substituting sulphonate groups into the styrene groups produced sulphonated resins having, the ion-exchange capacities given in Table 3.

TABLE 3

| Example No | Sulphonated product from | Ion-exchange capacity meq/g Theoretical | Measured |
|---|---|---|---|
| 9 | Example 1 | 0.31 | 0.26 |
| 10 | Example 2 | 0.17 | 0.13 |
| 11 | Example 4 | 0.64 | 0.52 |
| 12 | Example 7 | 0.17 | 0.13 |

The ion exchange capacities of these sulphonated resins were all greater than their non-sulphonated analogues.

EXAMPLE 13

100 grams of "KEL-F" powder similar to that used in Example 1 were suspended in 300 ml of a solution of maleic anhydride and tetrafluoroethylene in toluene. The solution contained 0.7 g/kg of maleic anhydride and 0.7 g/kg of tetrafluoroethylene.

The suspension was frozen by immersing its container in liquid nitrogen. It was degassed and allowed to regain room temperature. The degassing procedure was repeated three times and the container sealed.

The solution in the sealed container was heated to 70° C. and held at that temperature for 24 hours. The container and its contents were subjected to $\gamma$-radiation for a total of 50 hours at a dose rate of 100 krad/hr.

After irradiation the container was again immersed in liquid nitrogen, a necessary precaution with tetrafluoroethylene to freeze the suspension before the container was opened. The powder was washed free of unreacted and ungrafted homopolymer monomers. It was found that 20% graft had taken place. The powder was pressed to form a film which was then hydrolyzed. The ion exchange capacity of the hydrolyzed film was determined to be 0.64 meq/g. On the basis of the percentage graft and the ion exchange capacity it was calculated that the molar ratio of functional to non-functional groups in the side chains grafted on the "KEL-F" substrate was approximately 1:3.

EXAMPLE 14

In this example, the advantage of using a swelling solvent is demonstrated.

4 grams of "KEL-F" powder similar to that used in Example 1 were immersed in hot xylene. The powder swelled and absorbed an amount of xylene equal to approximately 7% of its own weight. Excess xylene was removed. An equimolar mixture of styrene and maleic anhydride was added to the swollen powder. After 12 hours the excess liquid phase was decanted off and the swollen powder with absorbed monomers was irradiated under nitrogen with radiation at a level of 80 krad/hour for 24 hours.

After removal of any homopolymer formed and of any unreacted monomers, the powder was hydrolyzed.

By the weight increase it was calculated there had been a 10.0% graft.

The ion exchange capacity of the resin was determined to be 1.1 meq/g which, assuming the styrene and maleic anhydride were grafted on in equimolar proportions, would indicate a 11.0% graft.

This resin is formed into a microporous diaphragm by the method described in Example 1.

EXAMPLES 15–26

These examples demonstrate the use of γ-radiation of perfluorinated films or powders in the presence of unsaturated perfluorinated monomers containing functional or functionable ion-exchange groups.

A sample of each monomer (5.0 gm) was placed in a glass reaction vessel, and (5.0 gm) of unsaturated perfluorinated monomer or monomer mixture added. The contents of the reaction vessel were frozen in liquid nitrogen and placed under vacuum to remove the air present in the system.

After thorough evacuation, the vacuum pump was disconnected and the contents allowed to thaw and reach room temperature. This process, hereinafter referred to as degassing, was repeated three times before sealing the reaction vessel.

Using this technique the contents of the reaction vessel were in a virtually oxygen-free atmosphere. Furthermore, the samples prepared, using this method, were then allowed to equilibrate at selected temperatures for a period of twenty-four hours.

After this time, the reaction vessel was transferred to an irradiation cell room and exposed for 120 hours to γ-rays emanating from a Cobalt-60 source of an intensity equivalent to 10 krad/hr.

In some experiments a solvent, trifluorotrichloroethylene, was added in the concentration shown in Table 4. The simultaneously irradiated contents of the reaction vessel received a total absorbed dose of 1.2 Mrad after termination of the irradiation, the contents of the glass reaction vessel were frozen in liquid nitrogen prior to opening the reaction vessel. The grafted substrate (film or powder) was washed free of unreacted monomer and homopolymer with a suitable solvent and dried in a vacuum oven at 60° C. to constant weight.

The percentage of graft (expressed as the weight increase of the film as a percentage of the weight of the grafted film), the infrared spectra of the grafted film (carbonyl absorption at frequency of 1795 cm$^{-1}$) and the ion exchange capacity (expressed as meq/g) are used to characterize the modified perfluorinated substrate produced by γ-radiation.

The results presented in Table 4 indicate that the perfluorinated hydrophobic substrate was grafted with unsaturated perfluorinated monomer having functional or functionable ion exchange groups.

In the Tables and description, the following abbreviations are used:
TFE=tetrafluoroethylene
PTFE=polytetrafluoroethylene
PEP=copolymer of tetrafluoroethylene and hexafluoropropylene
PFBA=perfluorobutenoic acid
MPFB=methyl perfluorobutenoate
MAA=methacrylic acid
IEC=ion exchange capacity The sizes given are in microns and refer to thickness, in the case of films, and particle size in the case of powders.

These films and powders are formed into microporous diaphragms by the method described in Example 1.

TABLE 4

| Example | Substrate | Size | Monomer Concentration % w/w PFBA | Monomer Concentration % w/w MPFB | Solvent concentration % w/w | % Graft | IEC meq/g |
|---|---|---|---|---|---|---|---|
| 15 | PTFE film | 175 | 100 | — | — | 2.5 | 0.13 |
| 16 | PTFE powder | 2–5 | 100 | — | — | 3.6 | 0.21 |
| 17 | PTFE film | 175 | — | 100 | — | 1.4 | — |
| 18 | PTFE powder | 2–5 | — | 100 | — | 2.2 | 0.11 |
| 19 | FEP film | 125 | 100 | — | — | 1.6 | — |
| 20 | FEP film | 125 | — | 100 | — | 1.2 | — |
| 21 | PTFE film | 175 | 30 | — | 70 | 3.1 | 0.15 |
| 22 | PTFE film | 175 | — | 30 | 70 | 2.4 | 0.11 |
| 23 | FEP film | 125 | 30 | — | 70 | 2.5 | 0.13 |
| 24 | FEP film | 125 | — | 30 | 70 | 1.8 | — |
| 25 | PTFE powder | 2–5 | 30 | — | 70 | 3.9 | 0.20 |
| 26 | PTFE powder | 2–5 | — | 30 | 70 | 2.3 | 0.11 |

EXAMPLES 27–38

In these examples the conditions used in the preceding examples were repeated except that the radiation grafting was carried out at the temperatures shown in Table 5 along with the results obtained.

TABLE 5

| Example | Substrate | Size | Monomer Concentration % w/w PFBA | Monomer Concentration % w/w MPFB | Solvent concentration % w/w | % Graft | Temp °C. | meq/g |
|---|---|---|---|---|---|---|---|---|
| 27 | PTFE film | 175 | 100 | — | — | 3.1 | 35 | — |
| 28 | PTFE | 175 | 100 | — | — | 3.9 | 80 | 0.21 |

TABLE 5-continued

| Example | Substrate | Size | Monomer Concentration % w/w PFBA | Monomer Concentration % w/w MPFB | Solvent concentration % w/w | % Graft | Temp °C. | meq/g |
|---|---|---|---|---|---|---|---|---|
| 29 | PTFE film | 175 | — | 100 | — | 2.1 | 35 | — |
| 30 | PTFE film | 175 | — | 100 | — | 3.0 | 80 | 0.13 |
| 31 | FEP film | 125 | 100 | — | — | 2.2 | 35 | — |
| 32 | FEP film | 125 | 100 | — | — | 3.1 | 80 | 0.15 |
| 33 | FEP film | 125 | — | 100 | — | 1.8 | 35 | — |
| 34 | FEP film | 125 | — | 100 | — | 2.6 | 80 | 0.11 |
| 35 | PTFE film | 175 | 30 | — | 70 | 3.5 | 50 | 0.17 |
| 36 | PTFE film | 175 | — | 30 | 70 | 3.0 | 50 | — |
| 37 | FEP film | 125 | 30 | — | 70 | 3.0 | 50 | 0.15 |
| 38 | FEP film | 125 | — | 30 | 70 | 2.5 | 50 | — |

EXAMPLES 39–43

In these examples the general conditions of Examples 15–26 were used except that the temperature of the mixture during radiation was 50° C. and the solvent was varied as shown in Table 6 along with the results obtained.

In each case the substrate was PTFE film of 175 micron thickness.

TABLE 6

| Example | Monomer Concentration % w/w PFBA | Monomer Concentration % w/w MPFB | Solvent | Solvent concentration % w/w | % Graft | IEC meq/g |
|---|---|---|---|---|---|---|
| 39 | 30 | — | CF$_2$ClCFCl$_2$ | 70 | 3.4 | 0.17 |
| 40 | 30 | — | water | 70 | 3.8 | 0.20 |
| 41 | 30 | — | methanol | 70 | 1.2 | — |
| 42 | 30 | — | carbon tetrachloride | 70 | 1.8 | — |
| 43 | — | 30 | carbon tetrachloride | 70 | 2.1 | 0.08 |

The grafted films are formed into microporous diaphgragms by the method described in Example 1.

EXAMPLES 44–49

These examples used the conditions of Examples 15–26 and illustrate the use of a mixture of two functional monomers.

TABLE 7

| Example | Substrate | Size | Monomer Concentration % w/w PFBA | Monomer Concentration % w/w MPFB | Monomer Concentration % w/w MAA | Solvent Concentration | % Graft | IEC meq/g |
|---|---|---|---|---|---|---|---|---|
| 44 | PTFE film | 175 | 25 | — | 25 | 50 | 17.6 | 0.78 |
| 45 | PTFE film | 175 | — | 25 | 25 | 50 | 20.0 | 0.44 |
| 46 | PTFE powder | 2–5 | 25 | — | 25 | 50 | 28.0 | 0.95 |
| 47 | PTFE powder | 2–5 | — | 25 | 25 | 50 | 31.2 | 1.12 |
| 48 | FEP film | 125 | 25 | — | 25 | 50 | 9.5 | 0.41 |
| 49 | FEP film | 125 | — | 25 | 25 | 50 | 12.1 | 0.35 |

EXAMPLE 50

This example illustrates the use of a grafting inhibitor α-pinene.

FEP film (2.0 g) was placed in a glass reaction vessel and PFBA (9.0 g), α-pinene (0.12 g, 0.5% total concentration), "Arklone" P (9.0 g), water (3.0 g) and ammonium perfluorooctanoate (0.025 g, 0.17% total concentration) were added to the vessel. ("Arklone" is a registered trade mark for 1,1,2-trichloro-1,2,2-trifluoroethylene).

The mixture was frozen in liquid nitrogen, the air was evacuated and contents allowed to come to room temperature. This process of degassing was repeated three times; then TFE (3.0 g, free from any inhibitor) was charged into the reaction vessel at liquid nitrogen temperature. The glass vessel was sealed and kept at room temperature overnight. It was then irradiated at 10 krad/hr for 120 hours at ambient temperature. The mixture received a total dose of 1.2 Mrad and it was frozen with liquid nitrogen again, prior to opening the glass vessel. The grafted film was collected, washed free of copolymers and unreacted monomers and dried in vacuum oven at 60° C.

The percentage graft was 47%. The infra-red spectrum of the grafted film showed the carbonyl absorption frequency to by 1795 Cm$^{-1}$ and its ion exchange capacity determined by titration was 0.2 meq/g.

This film is formed into a microporous diaphragm by the method described in Example 1.

EXAMPLES 51-55

The procedure of Example 50 was repeated except that the concentration of the inhibitor α-pinene was varied as shown in Table 8.

TABLE 8

| Example | Concentration of α-pinene % w/w | % Graft | IEC meq/g |
|---|---|---|---|
| 51 | 0.00 | 61 | 0.11 |
| 52 | 0.05 | 58 | — |
| 53 | 0.1 | 59 | 0.10 |
| 54 | 1.0 | 35 | 0.12 |
| 55 | 2.5 | 10 | 0.04 |

EXAMPLES 56-58

The procedure of Example 36 was repeated except that the "Arklone P" solvent was replaced by an equal weight of solvent or solvent mixture as shown in Table 9.

TABLE 9

| Example | Solvent | % Graft | IEC meq/g |
|---|---|---|---|
| 56 | "Arklone" P/chloroform (1:1) | 60.0 | 0.02 |
| 57 | Carbon tetrachloride/Chloroform (1:1) | 60.9 | — |
| 58 | Chloroform | 60.0 | — |

EXAMPLES 59-66

These examples demonstrate the effect of γ radiation on a perfluorinated microporous diaphragm in the presence of unsaturated perfluorinated monomers containing functional or functionable ion exchange groups.

The selected microporous diphragm "Goretex" (registered trade mark of Gore Associates) has a pore size around ∼100μ and thickness of ∼1500μ.

The "Goretex" diaphragm has pronounced hydrophobic properties but by the process of the invention a modified hydrophilic diaphragm was obtained. The method of Examples 15-26 was used and the results are given in Table 10. In each case a dose rate of 15 krad/hr was used to give a total dose of 1.25 Mrad. The solvent used was "Arklone" P.

TABLE 10

| Example | Substrate and size | Monomer Concentration % w/w | | | Solvent Concentration % w/w | Temp °C. | % Graft | IEC meq/g |
|---|---|---|---|---|---|---|---|---|
| | | PFBA | MPFB | MAA | | | | |
| 59 | "Goretex" 1500 | 100 | — | — | — | 35 | 4.8 | 0.28 |
| 60 | "Goretex" 1500 | — | 100 | — | — | 35 | 5.1 | 0.25 |
| 61 | "Goretex" 1500 | 100 | — | — | — | 80 | 5.6 | 0.31 |
| 62 | "Goretex" 1500 | — | 100 | — | — | 80 | 5.9 | 0.29 |
| 63 | "Goretex" 1500 | 30 | — | — | 70 | 35 | 3.8 | 0.20 |
| 64 | "Goretex" 1500 | — | 30 | — | 70 | 35 | 4.1 | 0.18 |
| 65 | "Goretex" 1500 | 25 | — | 25 | 50 | 35 | 26.3 | 0.91 |
| 66 | "Goretex" 1500 | — | 25 | 25 | 50 | 35 | 30.5 | 1.06 |

We claim:

1. An hydrophilic fluoropolymeric microporous diaphragm comprising a fluorine-containing polymeric substrate to which has been radiation co-grafted a mixture of monomers comprising at least one functional monomer selected from the group consisting of compounds of formula I $$CF_2=CF(CF_2)_nA,$$

and formula II $$CF_2=CF-O-(CFX-CFX)_mA$$

wherein A is carboxyl, alkoxycarbonyl, hydroxyalkoxy, carbonyl, cyano, hydroxsulfonyl, fluorosulfonyl, or the group —CO—NR$^1$R$^2$ wherein R$^1$ and R$^2$ are independently selected from hydrogen and C$_1$ to C$_6$ alkyl, one X is fluorine and the other X is selected from chlorine fluorine and a trifluoromethyl group, n is an integer from 1 to 12, m is an integer from 1 to 3, and unsaturated dicarboxylic acids or derivatives thereof containing the group of formula III

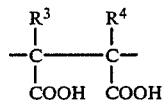

wherein R$^3$ and R$^4$ are independently selected from hydrogen, fluorine, chlorine, and C$_1$ to C$_6$ alkyl or halogenated C$_1$ to C$_6$ alkyl or together form a double bond; and at least one non-functional monomer selected from the group consisting of aliphatic vinyl monomers of formula IV and aromatic vinyl monomers of formula V

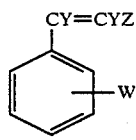

wherein Y is hydrogen or fluorine, Z is hydrogen, fluorine or chlorine, and W is hydrogen, C$_1$ to C$_6$ alkyl, C$_2$ to C$_6$ alkenyl, halogenated C$_1$ to C$_6$ alkyl or halogenated $C_2$ to $C_6$ alkenyl; and wherein the molar ratio of co-grafted functional monomer to co-grafted non-functional monomer is in the range of 2:1 to 1:20.

2. A microporous diaphragm according to claim 1 wherein the molar ratio of said functional monomer to said non-functional monomer is in the range of 2:1 to 1:3.

3. A microporous diaphragm according to claim 1 or claim 2 wherein the fluorine-containing polymeric substrate is a homopolymer or copolymer of a fluorinated ethylene.

4. A microporous diaphragm according to claim 3 wherein the fluorinated ethylene is vinylidene fluoride.

5. A microporous diaphragm according to claim 3 wherein the fluorinated ethylene is tetrafluoroethylene.

6. A microporous diaphragm according to claim 3 wherein the fluorinated ethylene is chlorotrifluoroethylene.

7. A microporous diaphragm according to claim 3 wherein the copolymer comprises hexafluoropropylene units.

8. A microporous diaphragm according to claim 1 wherein the fluorine-containing polymeric substrate is polytetrafluoroethylene.

9. A microporous diaphragm according to claim 1 wherein the fluorine-containing polymeric substrate is polychlorotrifluoroethylene.

10. A microporous diaphragm according to claim 1 wherein the fluorine-containing polymeric substrate is a copolymer of tetrafluorethylene and hexafluoropropylene wherein the hexafluoropropylene incorporated in the said copolymer is in the concentration range of 3.5–12.5% w/w.

11. A microporous diaphragm according to claim 1 wherein the compounds of formula I and II are pentafluorobutenoic acid, $C_1$ to $C_6$ alkyl pentafluorobutenoates and trifluorovinylsulfonyl fluoride.

12. A microporous diaphragm according to claim 11 wherein the said $C_1$ to $C_6$ alkyl pentafluorobutenoates are methyl pentafluorobutenoate and ethyl pentafluorobutenoate.

13. A microporous diaphragm according to claim 1 wherein the compounds of formula III are maleic acid, 1,2-difluoromaleic acid, acetylene dicarboxylic acid and anhydrides, amides and $C_1$ to $C_6$ alkyl esters thereof.

14. A microporous diaphragm according to claim 1 wherein the non-functional monomers of formula IV are tetrafluoroethylene and chlorotrifluoroethylene.

15. A microporous diaphragm according to claim 1 wherein the non-functional monomers of formula V are styrene, $\alpha$, $\beta$, $\beta$-triflurostyrene, divinylbenzene and $\alpha$, $\beta$, $\beta$, $\alpha'$, $\beta'$, $\beta'$-hexafluorodivinylbenzene.

16. A process of preparing an hydrophilic fluoropolymeric microporous diaphragm which process comprises radiation co-grafting onto a fluorine-containing polymeric diaphragm a mixture of monomers comprising at least one functional monomer selected from the group consisting of compounds of formula I $$CF_2=CF(CF_2)_nA,$$

and formula II $$CF_2=CF-O-(CFX-CFX)_mA$$

wherein A is carboxyl, alkoxycarbonyl, hydroxyalkoxycarbonyl, cyano, hydroxysulfonyl, fluorosulfonyl, or the group $-CO-NR^1R^2$ wherein $R^1$ and $R^2$ are independently selected from hydrogen and $C_1$ to $C_6$ alkyl, one X is fluorine and the other X is selected from chlorine fluorine and a trifluoromethyl group, n is an integer from 1 to 12, m is an integer from 1 to 3, and unsaturated dicarboxylic acids or derivatives thereof containing the group of formula III

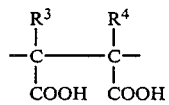

wherein $R^3$ and $R^4$ are independently selected from hydrogen, fluorine, chlorine, and $C_1$ to $C_6$ alkyl or halogenated $C_1$ to $C_6$ alkyl or together form a double bond; and at least one non-functional monomer selected from the group consisting of aliphatic vinyl monomers of formula IV $$CY_2=CYZ$$

and aromatic vinyl monomers of formula V

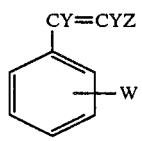

wherein Y is hydrogen or fluorine, Z is hydrogen, fluorine or chlorine, and W is hydrogen, $C_1$ to $C_6$ alkyl, $C_2$ to $C_6$ alkenyl, halogenated $C_1$ to $C_6$ alkyl or halogenated $C_2$ to $C_6$ alkenyl; and wherein the molar ratio of functional monomer to non-functional monomer is in the range of 1:20 to 9:1.

17. A process according to claim 16 wherein the molar ratio is in the range of 1:4 to 4:1.

18. A process according to claim 16 wherein the molar ratio is in the range of 1:2 to 2:1.

19. A process according to claim 16 wherein the material comprising the diaphragm and the mixture of monomers are subjected together to irradiation by any one form of radiation selected from the group consisting of $\gamma$-rays, X-rays and electron beams.

20. A process according to claim 16 wherein the mixture of monomers is dissolved in a solvent capable of swelling the diaphragm.

21. A process according to claim 16 wherein before addition of the monomers the diaphragm is treated with a solvent capable of swelling the diaphragm.

22. A process according to claim 20 wherein the solvent is selected from the group consisting of toluene, xylene, trichlorotrifluoroethane and oligomers of tetrafluoroethylene.

23. A process according to claim 16 wherein the mixture of monomers additionally comprises at least one polymerization inhibitor and at least one chain transfer agent.

24. A process according to claim 23 wherein the polymerization inhibitor is selected from the group consisting of p-benzoquinone, naphthaquinone, hydroquinone in the presence of oxygen, copper acetate, 2,2,6,6-tetramethyl-4-oxopiperidine-1-oxide, 2,2,6,6-tetramethylpiperazine-N-oxide, and chloranil.

25. A process according to claim 23 wherein the polymerization inhibitor is in the concentration range of 0.001 to 2% w/w of the total mixture of monomers and charger transfer agent.

26. A process according to claim 25 wherein the concentation range is 0.01 to 0.5% w/w.

27. A process according to claim 24 wherein the chain transfer agent is a solvent selected from the group consisting of chloroform, carbon tetrachloride, dimethylformamide and mixtures thereof.

28. A process according to claim 24 wherein the concentration of the monomers in the chain transfer solvent is in the range of 10 to 60% w/w.

29. A process according to claim 28 wherein the said range is 30–50% w/w.

* * * * *